US006833954B2

(12) United States Patent
Zweiback et al.

(10) Patent No.: US 6,833,954 B2
(45) Date of Patent: Dec. 21, 2004

(54) LITHOGRAPHIC METHOD FOR MANUFACTURING A MASK USED IN THE FABRICATION OF A FIBER BRAGG GRATING

(75) Inventors: Jason Zweiback, Fremont, CA (US); Joshua E. Rothenberg, San Jose, CA (US); Jan Popelek, Fremont, CA (US); Roger F. Caldwell, Mill Valley, CA (US)

(73) Assignee: Teraxion Inc., Sainte-Foy (CA)

( * ) Notice: Subject to any disclaimer, the term of this patent is extended or adjusted under 35 U.S.C. 154(b) by 0 days.

(21) Appl. No.: 09/957,443

(22) Filed: Sep. 18, 2001

(65) Prior Publication Data

US 2002/0102055 A1 Aug. 1, 2002

Related U.S. Application Data

(60) Provisional application No. 60/234,318, filed on Sep. 20, 2000, provisional application No. 60/243,423, filed on Oct. 25, 2000, provisional application No. 60/235,873, filed on Sep. 27, 2000, and provisional application No. 60/241,594, filed on Oct. 18, 2000.

(51) Int. Cl.$^7$ ............................................. G02B 5/18

(52) U.S. Cl. ........................... 359/566; 385/31; 385/37

(58) Field of Search .................. 385/31, 37; 359/566, 359/564, 575

(56) References Cited

U.S. PATENT DOCUMENTS

| | | | | |
|---|---|---|---|---|
| 5,909,313 | A | * | 6/1999 | Lee .............................. 359/569 |
| 6,084,995 | A | * | 7/2000 | Clements et al. ............. 385/37 |
| 6,114,071 | A | | 9/2000 | Chen et al. |
| 6,344,298 | B1 | * | 2/2002 | Starodubov et al. ........... 430/5 |
| 6,466,714 | B1 | * | 10/2002 | Kurihara et al. .............. 385/37 |
| 6,483,965 | B1 | * | 11/2002 | Napier et al. ................. 385/37 |

OTHER PUBLICATIONS

Albert, J. et al., "Minimization of Phase Error in Long Fiber Bragg Grating Phase Masksmade Using Electron Beam Lithography," IEEE Photonics Technology Letters, IEEE Inc., New York, US, Oct. 1, 1996, vol. 8, No. 10, pp. 1334–1336.

Tiberio, R.C. et al., "Fabrication of electron beam generated, chirped, phase mask (1070.11–1070.66nm) for fiber Bragg grating dispersion compensator," Journal of Vacuum Science and Technology: Part B, Nov. 1998, vol. 16, No. 6, pp. 3237–3240.

Chakarian, V. et al., "System architecture choices for an advanced mask writer (100–130 nm)," Proceedings of the SPIE, Sep. 1999, vol. 3873, pp. 1–15.

Morgante, C.G., et al., "The ALTA 3700: Extending thE Application Space of the ALTA 3500 Laser Recticle Writer," Proceedings of the SPIE, Apr. 2000, vol. 4066, pp. 1–11.

Rishton S.A. et al., "Raster shaped beam pattern generation," Journal of Vacuum Science and Technology: Part B, American Institute of Physics, New York, US, Nov. 1999, vol. 17, No. 6, pp. 2927–2931.

(List continued on next page.)

*Primary Examiner*—Drew A. Dunn
*Assistant Examiner*—Joshua L Pritchett
(74) *Attorney, Agent, or Firm*—Fulbright & Jaworski LLP

(57) ABSTRACT

The invention reduces the effects of stitching errors from re-scaling or re-positioning in the fabrication of fiber Bragg gratings or the mask used in such fabrication. A first embodiment of the invention preferably uses characteristics of stitching errors to compensate for the stitching errors themselves. By increasing the number of stitching errors, errors caused by the stitching errors can be reduced. A second embodiment uses continuous writing of the desired pattern, wherein the desired pattern is snapped to a grid that can be written by the fabrication equipment. Using continuous writing eliminates stitching errors in the resulting gratings.

76 Claims, 6 Drawing Sheets

OTHER PUBLICATIONS

Pfeiffer H.C., et al., "EL–4, A New Generation Electron–Beam Lithography System," Journal of Vacuum Science and Technology: Part B, American Institute of Physics, New York, US, Nov. 1, 1993, vol. 11, No. 6, pp. 2332–2341.

Hill, K.O., et al., "Fiber Bragg Grating Technology Fundamentals and Overview," Journal of Lightwave Technology, Aug. 1997, vol. 15, No. 8, pp. 1263–1276.

Ericksson, U. et al., "Design of Fiber Gratings For Total Dispersion Compensation," Optics Letters, Optical Society of America, Washington, US, Jul. 15, 1994, vol. 19, No. 14, pp. 1028–1030.

Communication Relating to the Results of the Partial International Search, PCT/US01/29178, mailed Aug. 20, 2003.

* cited by examiner

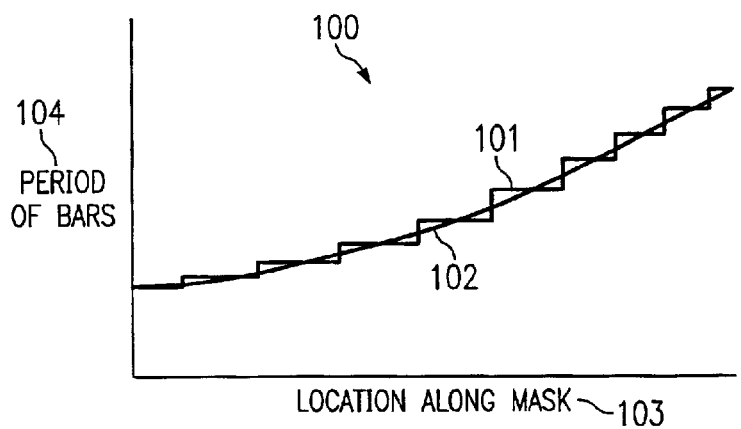
FIG. 1
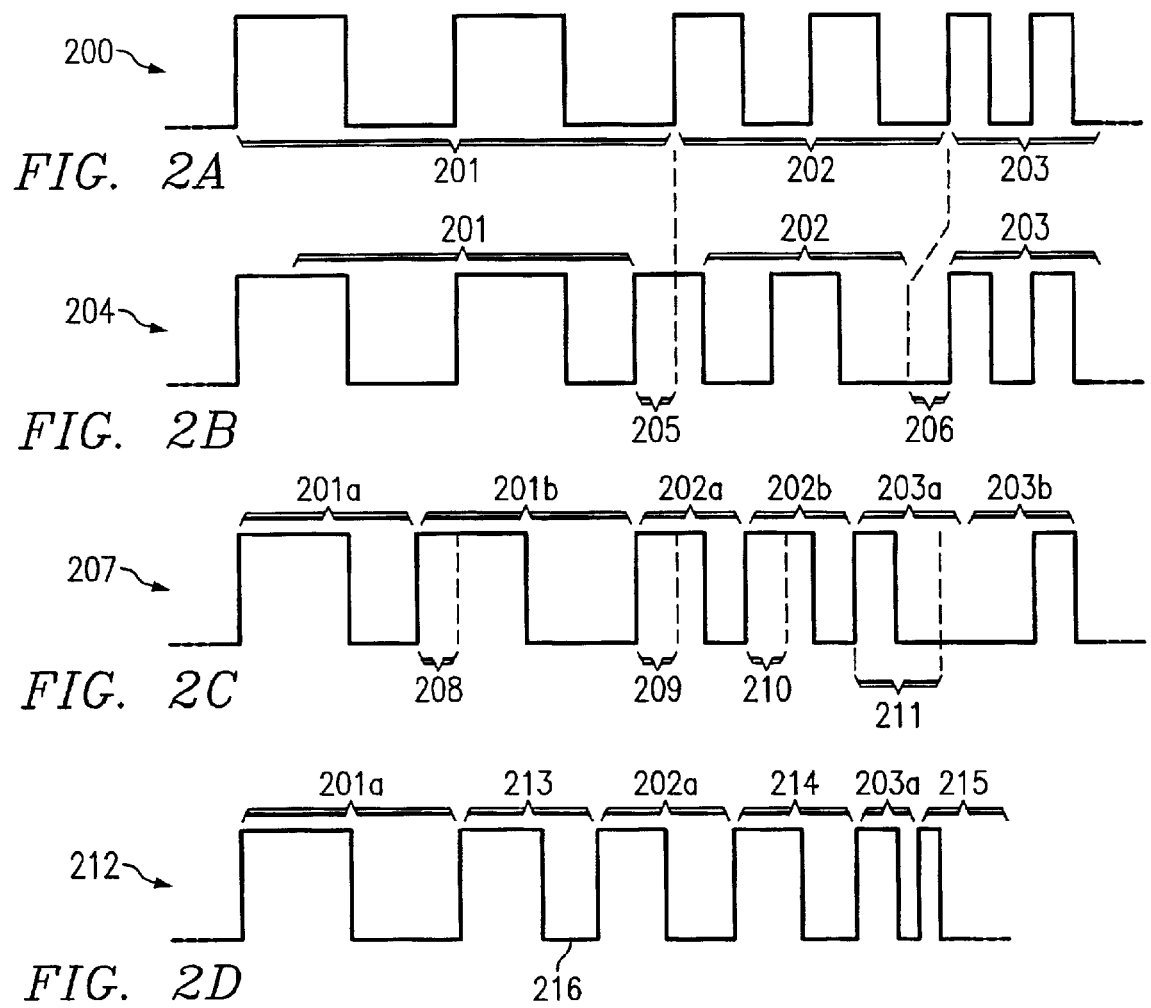
FIG. 2A
FIG. 2B
FIG. 2C
FIG. 2D

LITHOGRAPHIC METHOD FOR MANUFACTURING A MASK USED IN THE FABRICATION OF A FIBER BRAGG GRATING

CROSS-REFERENCE TO RELATED APPLICATIONS

The present application claims benefit of priority to Provisional Application Ser. No. 60/234,318 entitled "EFFICIENT PERIODIC SUPER-STRUCTURES IN WAVEGUIDES TO PRODUCE SPECTRAL RESPONSE OVER MANY CHANNELS AND FABRICATION METHODS FOR THESE STRUCTURES" filed Sep. 20, 2000, 60/243,423 entitled "SAMPLED FIBER BRAGG GRATING BASED ON MULTILEVEL PHASE CHANGE TECHNOLOGY" filed Oct. 25, 2000, 60/235,873 entitled "EFFICIENT PERIODIC SUPER-STRUCTURES IN WAVEGUIDES" filed Sep. 27, 2000, and 60/241,594 entitled "SAMPLED FIBER BRAGG GRATING BASED ON MULTILEVEL PHASE CHANGE TECHNOLOGY" filed Oct. 18, 2000, the disclosures of which are hereby incorporated herein by reference; and is related to commonly assigned, co-pending U.S. application Ser. No. 09/757,386 entitled "EFFICIENT SAMPLED GRATINGS FOR WDM APPLICATIONS" filed Jan. 8, 2001, and 09/883,081 entitled "LITHOGRAPHIC FABRICATION OF PHASE MASK FOR FIBER BRAGG GRATINGS" filed Jun. 15, 2001, the disclosures of which are hereby incorporated herein by reference.

BACKGROUND OF THE INVENTION

The present invention relates in general to fiber Bragg gratings, and in specific to methods and apparatuses for producing masks that are used to create fiber Bragg gratings.

Normal optical fibers are uniform along their lengths. A slice from any one point of the fiber looks like a slice taken from anywhere else on the fiber, disregarding tiny imperfections. However, it is possible to modify fibers in such a way that the refractive index varies regularly along their length. These fibers are called fiber Bragg gratings (FBG). The periodic refractive index variation causes different wavelengths of light to interact differently with the fiber, with certain wavelengths being reflected and certain wavelengths being transmitted.

Whenever there is a change in the index of refraction within the fiber, there is a slight reflection from the transition. In an FBG there are many of these slight reflections. The locations of these reflections are arranged such that the reflections all interfere with each other to create a strong reflection at a certain wavelength. This is the so called Bragg condition, and is satisfied when the wavelength of light is equal to twice the period of the index modulation times the overall index of refraction of the fiber. Light that does not meet this Bragg condition will be transmitted.

FBGs can be used to compensate for chromatic dispersion in an optical fiber. Dispersion is the spreading out of light pulses as they travel on the fiber. Dispersion occurs because the speed of light through the fiber depends on its wavelength, polarization, and propagation mode. The differences are slight, but accumulate with distance. Thus, the longer the fiber, the more dispersion. Dispersion can limit the distance a signal can travel through the optical fiber because dispersion cumulatively blurs the signal. After a certain point, the signal has become so blurred that it is unintelligible. The FBGs are used to compensate for chromatic (wavelength) dispersion by serving as a selective delay line. The FBG delays the wavelengths that travel fastest through the fiber until the slower wavelengths catch up. The spacing of the grating is chirped, varying along its length, so that different wavelengths are reflected at different points along the fiber. These points correspond to the amount of delay that the particular wavelengths need to have so that dispersion is compensated. Suppose that the fiber induces dispersion such that a longer wavelength travels slower than a shorter wavelength. Thus, a shorter wavelength would have to travel farther into the FBG before being reflected back. A longer wavelength would travel less far into the FBG. Consequently, the longer and shorter wavelengths can be made coincidental, and thus without dispersion. FBGs are discussed further in Feng et al. U.S. Pat. No. 5,982,963, which is hereby incorporated herein by reference in its entirety. A circulator is used to separate the light reflected from the FBG onto a different fiber from the input. With a properly designed FBG, the group delay is a function of the wavelength of the reflected beam and has the desired shape to compensate for dispersion (group delay) accumulated in propagation through an optical communication transmission system. One practical problem encountered with such FBG devices is that the group delay fluctuates around the desired functional shape. This deviation shall be referred to as group delay ripple (GDR) and is generally deleterious to the quality of transmitted optical signals.

FBGs are typically fabricated in two manners. The first manner uses a phase mask. The phase mask is a quartz slab that is patterned with a grating. The mask is placed in close proximity with the fiber, and ultraviolet light, usually from an ultraviolet laser, is shined through the mask and into the fiber. As the light passes through the mask, the light is primarily diffracted into two directions, which then forms an interference pattern in the fiber. The interference pattern comprises regions of high and low intensity light. The high intensity light causes a change in the index of refraction of that region of the fiber. Since the regions of high and low intensity light are alternating, a FBG is formed in the fiber. See also Kashyap, "Fiber Bragg Gratings", Academic Press (1999), ISBN 0-12-400560-8, which is hereby incorporated herein by reference in its entirety.

The second manner is known as the direct write FBG formation. In this manner two ultraviolet beams are impinged into the fiber, in such a manner that they interfere with each other and form an interference pattern in the fiber. At this point, the FBG is formed in the same way as the phase mask manner. One of the fiber or the writing system is moved with respect to the other such that the interference pattern is scanned and the fiber exposed. Note that the two beams are typically formed from a single source beam by passing the beam through a beam separator, e.g. a beamsplitter or a grating. Also, the two beams are typically controlled in some manner so as to allow control over the locations of the high and low intensity regions. For example, Laming et al., WO 99/22256, which is hereby incorporated herein by reference in its entirety, teaches that the beam separator and part of the focusing system are moveable to alter the angle of convergence of the beams, which in turn alters the fringe pitch on the fiber. Another example is provided by Glenn, U.S. Pat. No. 5,388,173, and Stepanov et al., WO 99/63371, both of which are hereby incorporated herein by reference in their entirety. Both teach the use of an electro-optic module, which operates on the beams to impart a phase delay between the beams, which in turn controls the positions of the high and low intensity regions.

Note that whichever manner is used, it is still difficult to manufacture FBGs. The period of the spacing of the index modulation of the fiber Bragg grating is typically about one-half micron. When a phase mask is used to fabricate an FBG, the period of the mask grating is chosen to be twice that of the FBG, or about 1 micron. Thus, the etched bars and spaces which comprise the phase mask are about five hundred nanometers in width. For example, one application of the FBG is dispersion compensation. In this application FBGs must have a chirp (a slow variation) in the period, which is typically a very small change (~1 nm) over the length of the FBG. Thus, the spacing would ideally need to be adjusted on a picometer scale to have the period change appropriately over the length of the grating. This presents a serious challenge in design of any grating writing system. Inaccuracies in forming the chirp can cause group delay ripple in the output of the FBG.

Each FBG writing manner has advantages and disadvantages when compared with each other. For example, the first manner, the phase mask manner, is relatively inflexible, as changes cannot be made to the mask. However, since the phase mask is permanent, the phase mask manner is stable, repeatable, and aside from the cost of the mask, relatively inexpensive to operate. On the other hand, the direct write manner is very flexible, and can write different gratings. However, this manner is less repeatable and is costly to operate. Also, the direct writing process must be very strictly controlled. Any variation will lead to differences between gratings. This is difficult because the coherence (i.e. the relative position of the index modulation on a nm scale) of the entire pattern, e.g. 20 cm or greater, must be maintained. Little changes in alignment, temperature, etc. can result in the loss of coherence.

Another problem with the phase mask manner resides in the fabrication of the masks. Masks are fabricated by lithographic or holographic techniques. More specifically, the exposure of the resist that coats the mask may be done holographically, as well as lithographically. In the lithographical method, a small beam (of width smaller than the minimum mask feature size—0.5 micron) is used to directly expose the resist with the desired pattern. In the holographic method, two large (large meaning having a beam section that is approximately the same size as the mask) beams are interfered with each other to produce a periodic intensity pattern that exposes the resist on the mask substrate. While this process is used for simple masks, it is limited in its capabilities since the phase fronts of the interfering beams cannot be easily varied arbitrarily. For complicated masks, containing phase shifts and complex (nonlinear) chirp functions, current art holographic methods are not effective and lithographic methods are preferred.

The mask slab is coated on its surface with resist, which is a light (photo) or particle (electron or ion) sensitive material. Under the resist, the slab may also be coated with a metallic layer (e.g. chrome) to assist conduction of charged particles away from the exposed regions. Regions or bars of the resist are illuminated by light or particle beams according to a desired pattern, which is generally an array of parallel bars along a straight line with precisely selected positions. This illumination causes chemical changes in the exposed regions of resist. The exposed resist can be preferentially removed from the slab by a chemical or plasma, which does not strongly affect the unexposed resist (or vice versa). After the preferential removal of the resist according to the desired pattern, the slab may then be etched by a different chemical or plasma, which preferentially etches the slab where the resist has been removed. The etched portions of the slab have a difference in thickness or height from the un-etched portions. When the etched (bars) and un-etched (spaces) portions are patterned to form an array along a substantially straight line, the differences in thickness form a phase grating. Thus, by etching an array of bars and spaces on the slab to form a grating, a phase mask is fabricated. Other lithography tools can directly etch the bars and spaces onto the mask rather than in resist. In another embodiment, these regions can have alternate transmittance properties, such as by the presence or absence of an opaque material (e.g. chrome), and thus form an amplitude grating. Note that in all these cases, the critical part of the fabrication is the exposure of the bars and spaces (or direct etching of the bars and spaces). The resulting mask is limited by the quality and precision of the exposure process.

Current lithographic techniques use segmenting to encode the chirp into the mask. Due to the limitations of the lithographic writing machines, the period of the grating cannot be continuously varied. Fortunately, the grating can be written as a series of butt-coupled uniform period gratings which approximate a grating with a continuously varying period in a stepwise manner. A first series of bars, e.g. 500 bars, are written at a first period. A second series of bars are written at a second period, which is slightly different from the first period, and so on, until the desired variation of period (chirp) is written into the entire mask. The lithographic machines typically have a scaling feature that allows a segment to be scaled in size to picometer accuracy. Thus, a first segment is written at a first scale, and then the segment is rescaled to a different scale, which is slightly different from the first scale, and so on, until the mask is completely written.

This solution might be adequate for creating the proper pitch, but still suffers from a positioning error that occurs when the position is changed to write subsequent segments. This type of error is known as a 'stitching error'. Thus, each time the machine is rescaled and repositioned for a different segment, another stitching error is added to the mask. This, in turn, introduces an error into the grating that is written into the fiber. These errors cause group delay ripple in the optical signal reflected from the FBG. Consequently, the prior art attempts to write as few segments as possible, thus minimizing the number of stitching errors. For example, a typical mask would need about 100–200 scaled segments to encode the chirp into the mask. Thus, the prior art would only write about 100–200 scaled segments.

Note that the current technology for lithography does have the capability to write continuous patterns (so called cursive writing) effectively without such stitching errors. However, this cursive writing cannot be used to make masks for chirped FBGs and/or FBGs with arbitrary phase shifts (positional shifts of the bars or spaces, or changes in the bar or space widths or period), without the introduction of stitching errors. This is because such cursive writing methods would not allow for resealing of the grating period along the length of the phase mask. In addition, the locations of the bars and spaces on the mask are limited to fit on an address unit grid which is much too coarse to allow the picometer scale positioning required of the varying grating period.

BRIEF SUMMARY OF THE INVENTION

These and other objects, features, and technical advantages are achieved by a system and method system which uses current lithography tools to fabricate masks with greatly reduce the effects of stitching errors from re-scaling or re-positioning. The masks fabricated by the invention will generate the linear or non-linear chirp, and other phase shifts as desired, in the fiber Bragg grating (FBG) in the core of the fiber.

A first embodiment of the invention preferably uses a characteristic of stitching errors to compensate for the stitching errors themselves. Each stitching error is typically random. Some stitching errors are formed when the segments are too far apart, thereby having too wide a space between the end bars of the adjacent segments. Other stitching errors are formed when the segments are too close together, thereby having too narrow a space between the end bars of the adjacent segments. Consequently, error induced by one stitching error may be offset by another stitching error. The invention preferably takes advantage of the characteristic that the effective error introduced into the grating from the mask with the stitching errors is the root mean square (RMS) of the stitching errors, when averaged over a length determined by the characteristics of the FBG design. This averaging length is typically on the order of 1 mm, and thus since the mask period is about 1 micron, the averaging occurs over about 1000 periods of the mask. Thus, increasing the number of stitching errors, by increasing the number of segments, can increase the number of errors being averaged by the light passing through the FBG. This increases the population of stitching errors and normalizes the mean, by bringing the median value closer to the mean value of pool of stitching errors. Thus, the overall average is brought closer to zero or no error. In other words, this increase in the number of stitching errors tends to reduce the RMS of the effective net stitching error by averaging out the stitching errors, and hence reduces the group delay ripple of a FBG created from the mask. Thus, a mask with an increased number of stitching errors, so long as these additional errors occur over the effective averaging length of the FBG, produces a grating with a lower group delay ripple error. If 1000 such errors are introduced over the effective averaging length in the FBG, then the net effective stitching error should be reduced by about $\sqrt{1000}$ or about 30 times.

The first embodiment is preferably implemented in one of two ways. In the first way, each segment is split into a plurality of segments that have the same scaling. For example, assume the example of the prior art segments, wherein 200 segments are used to form a 10 cm long mask, with each segment having a slightly different scaling factor. Each segment may be further split into 4 segments for a total of 800 segments, with each sub-segment within a particular group having the same scaling factor. In the second way, the scaling factor is adjusted for each of the smaller segments. For example, assume the example of the prior art segments, wherein 200 segments are used to form a mask, with each segment having a different scaling factor, as compared with an adjacent segment. This scaling change is generally extremely small. For a typical application of a 10 cm grating with 200 segments, the period may change about 3 pm per segment, as compared to the nominal 1000 nm period, or a scale change of about $3 \times 10^{-6}$. Each segment may then be further split into 4 segments for a total of 800 segments, with each segment having a smaller change in scaling factor of about $7.5 \times 10^{-7}$, as compared with an adjacent segment.

A second embodiment uses continuous writing of the desired pattern. Instead of writing a series of scaled segments, the entire grating or mask is written in one cursive writing cycle at a single scale, i.e. one continuous single-scale segment. Thus, there should not be any stitching errors as the writing equipment is not stopped for resealing and re-alignment. In writing a grating pattern that includes a fine scale chirp, the desired size of the bars and spaces (i.e. the location of the edges) may not be achievable on the address unit or pixel grid required by the writing equipment. The invention has the bar and/or spacing lines moved or snapped to the nearest address unit or grid. The error of placement of bar edges would accumulate as a difference between the ideal and the desired pattern until the error at most equals one-half of a pixel width, and then the edge would snap to the next grid location. While the misalignment between the designed edges and the actual edges will induce many more errors in the resulting fiber Bragg grating than the current art of using rescaled segments, the effective net error is minimized by the averaging described above with regards to the first embodiment. For a uniform distribution of error up to ±one-half of the grid spacing (or pixel size) p, the expected statistical RMS error for each edge placement is found to be about ±0.29 p. In this case, for example, with the current lithography tools, the pixel size is p=5 nm, and the expected RMS error of an edge is ~±1.5 nm. Since these errors occur at every edge, which are typically separated by ~1 µm, in the above example of an effective averaging length of ~1 mm, ~1000 edge errors are averaged and therefore the effective net averaged error is reduced by $\sqrt{1000}$~30 and is thus only ~50 pm.

Note that the above described inventive embodiments can also be used for FBGs that have a second periodic pattern superimposed on the basic pattern. In general this pattern is introduced as an amplitude pattern or periodic set of phase shifts (see for example, U.S. application Ser. No. 09/757,386 entitled "EFFICIENT SAMPLED GRATINGS FOR WDM APPLICATIONS" filed Jan. 8, 2001, the disclosure of which is hereby incorporated herein by reference). This pattern serves to sample the initial grating, creating duplicate reflective channels at a spacing dependent on the period of the secondary (sampling) pattern.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 1 depicts a plot of the period of the bars of a mask with the location along the mask for a mask formed according to the first embodiment of the invention;

FIGS. 2A–2D depict a portion of the profiles of the bars and space of different masks according to the first embodiment of the invention;

DETAILED DESCRIPTION OF THE INVENTION

Figure 3A:
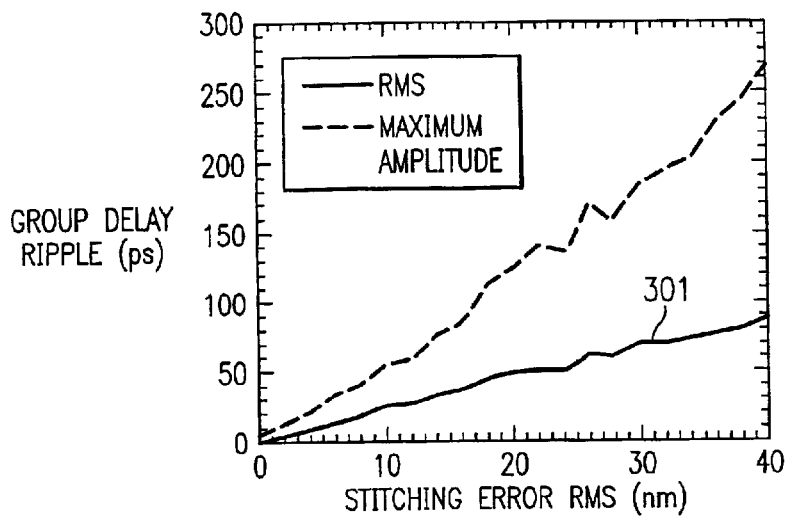
FIGS. 3A–3E depict graphs showing the group delay ripple for the masks having different number of segments according to the first embodiment of the invention.

FIG. 1 depicts a plot 100 of the period of the bars 104 (and spaces) of a mask with the location along the mask 103 for a mask formed according to the first embodiment of the invention. Note that FIG. 1 is not showing the length of the segments, but rather the period of the bars within the segments. As shown FIG. 1, the period of the bars is increased in a step-wise fashion 101, with incremental changes as the mask is traversed. Note that the number of steps is shown by way of example only as the inventive mask could comprise many more steps. The steps approximate the desired continuous curve 102. Note that the steps 101 and curve 102 depict a non-linear chirp. This is by way of example only, as the invention would operate with a linear chirp or no chirp, as well. Also, note that the segment lengths can be arbitrarily chosen and do not have to be equal. Still further note that the invention is described in terms of a mask, but could work for direct writing of index modulation into the FBG as well. However, direct writing a very large number of segments into the FBGs may require more time than is practical for a commercial production environment.

FIGS. 2A to 2D depict a portion of the profiles of the bars and spaces of different masks. FIG. 2A depicts an ideal profile 200. This profile is shown to have three different segments, 201, 202, and 203, with each segment having two cycles. Each segment has a different period. Note that in FIGS. 2A to 2D, the number and size of the segments, and the number and size of the cycles is by way of example only, as other numbers and sizes could be used. FIG. 2B depicts a profile 204 similar to that of FIG. 2A, but with a stitching error 205. Error 205 is formed by having segment 202 too close to segment 201. Note that space 206 is not a separate error, but rather is a result of error 205 as the entire segment 202 has been shifted. Even though the spacing between 202 and 203 is not correct in profile 204, segment 203 is located in the same location as it is in profile 200. Note that a stitching error is an error from the correct absolute placement of the segment as compared with the desired profile, not the relative placement from segment to segment. Thus, space 206 is not a stitching error with respect to the proper placement of segment 203.

The stitching errors are assumed to be random. Thus, additional errors may be present or fewer errors may be present. The errors may occur at arbitrary locations in the profile. This invention makes use of the characteristic that the light which reflects from the FBG is not strongly affected by the individual stitching errors, but rather by the average of the errors over an interaction length. The average of random stitching errors will tend to be reduced to zero, however there is some standard deviation associated with the distribution of errors. The difference between the expected average and average of the actual errors in a particular mask will be inversely proportional to the square root of N, where N is the number of stitching errors over the effective averaging length. In the current art, N is a relatively small number, and hence the average of the stitching error can vary widely and the light can be subject to a large net stitching error.

This invention increases the value of N to a large value in order to reduce the effective averaged stitching error towards the expected average value, namely zero. Assuming each stitching error has an expected value (RMS) of $\pm\epsilon_0$, then the expected value of the average of N such errors is given by $$\varepsilon_{ave} = \left(\sqrt{\Sigma \varepsilon_0^2}\right)/N$$

and since the expected value of all the stitching errors is the same ($\epsilon_0$), one finds $\epsilon_{ave}=\epsilon_0/\sqrt{N}$. Thus, for example, if the effective interaction length for averaging of the stitching errors is 1 mm, the segment length is 0.5 mm, then the number of segments and stitching errors averaged is N=2, and if the individual stitching error is ±5 nm, then one expects an averaged error of $5/\sqrt{2}=3.5$ nm. If instead, for example, one chooses a segment length of 10 μm, then N=100, and the effective averaged stitching error over 1 mm is only $5/\sqrt{100}=0.5$ nm. Thus, the first embodiment of the invention is to increase the number of stitching errors, by increasing the number of segments in the mask to reduce the expected averaged error, and hence, the group delay ripple of an FBG written from the mask.

FIG. 2C depicts one way to increase the number of stitching errors. The profile 207 of FIG. 2C has each segment of FIG. 2A divided in sub-segments. For example segment 201 has been divided into 201a and 201b, while segment 202 has been divided into 202a and 202b. Similarly segment 203 has been divided into 203a and 203b. Note that each of the sub-segments created from a single segment has the same period as the original segment, as well as with each other, i.e. the sub-segments have the same scaling. Note that the increased number of segments has resulted in an increased number of stitching errors 208, 209, 210, 211. Changing scale and repositioning of the lithography tool for each segment or sub-segment can increase the individual (sub-)segment stitching errors. In this manner, the scale is not adjusted for every sub-segment and thus any error due to a scaling change may be systematically present in the entire group of sub-segments. Therefore the contribution to stitching error from rescaling may not be averaged out with this manner.

FIG. 2D depicts another way to increase the number of stitching errors. The profile 212 of FIG. 2D, separates the segments of FIG. 2A into sub-segments, but has a different period for each sub-segment. Thus, the scaling factor is adjusted for each of the sub-segments according to the desired chirp function. For example, sub-segments 201a, 202a, and 203a have the same period as segments 201, 202, and 203, respectively, but the other sub-segments have different periods. For example, sub-segment 213 has a period that is smaller than 201 (or 201a), but larger than 202 (or 202a). Similarly, sub-segment 214 has a period that is between that of 202 (or 202a) and 203 (or 203a), while sub-segment 215 has a period that is between 203 (or 203a) and the next segment (or sub-segment). Note that only one stitching error 216 is shown for simplicity, as additional stitching errors would hinder the understanding of the different periods between the sub-segments. Further note that this embodiment has been described in terms of dividing the segments of an existing design, however, additional segments may be formed on the mask in an arbitrary manner, each with a period selected according to the desired chirp design. Since in this manner the scaling changes every sub-segment, averaging of the errors from rescaling is obtained.

Figure 3B:
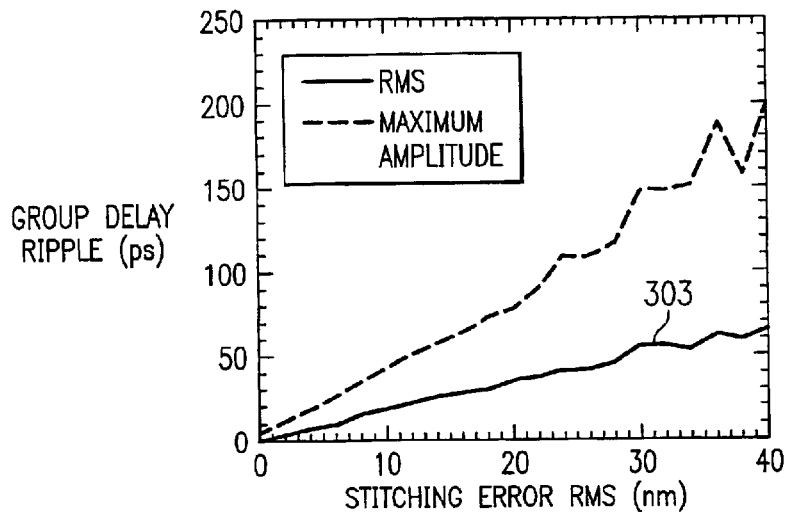
Figure 3C:
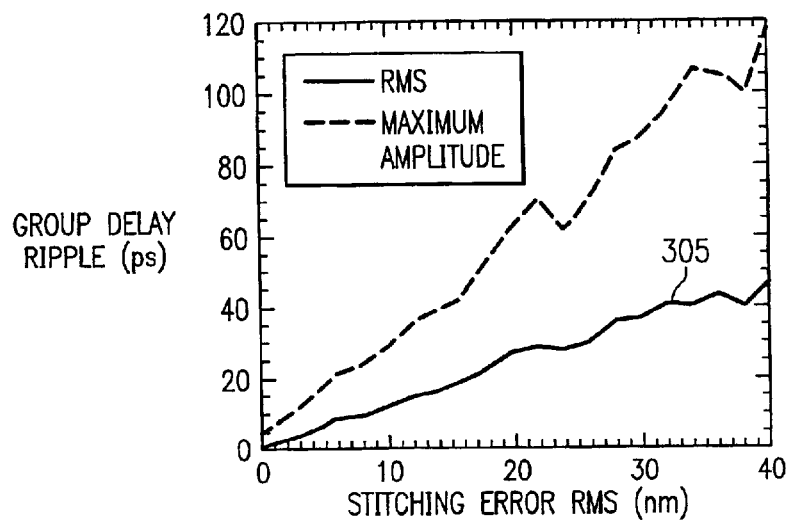
Figure 3D:
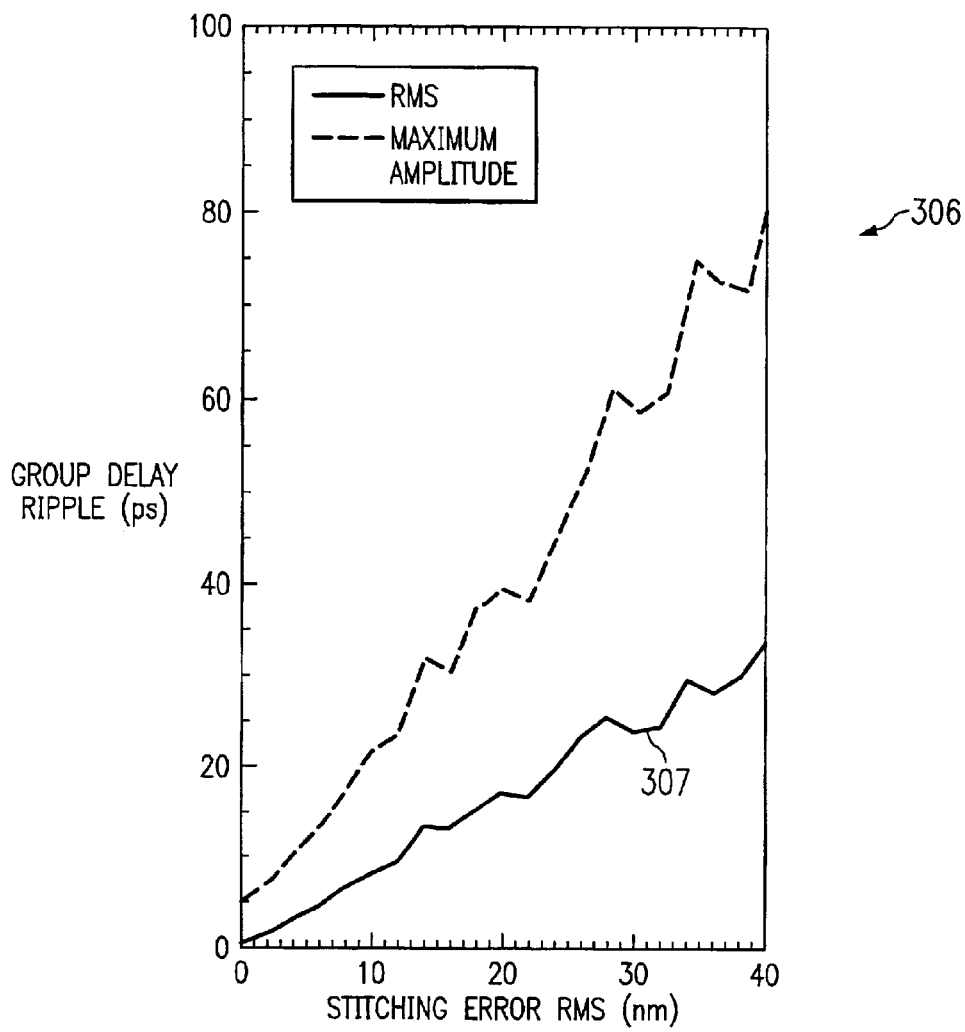
Figure 3E:
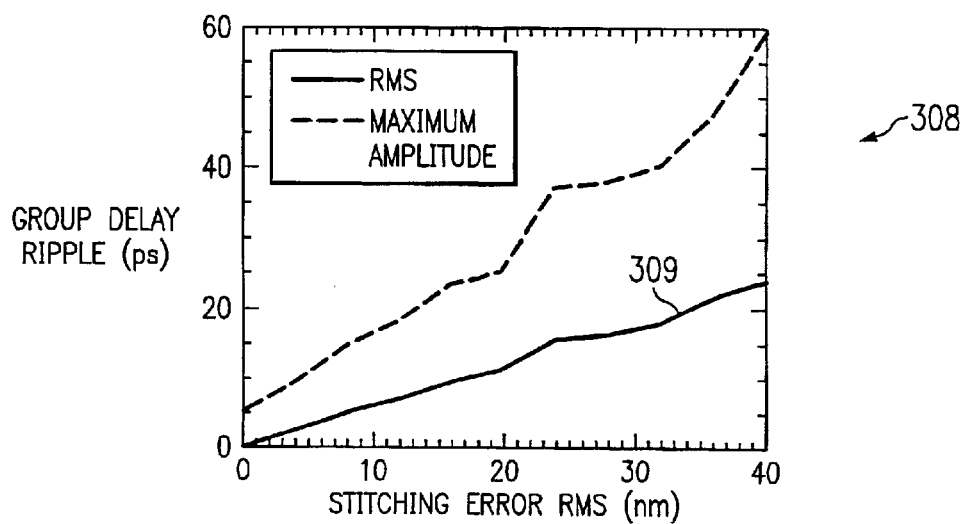

FIGS. 3A to 3E depict graphs showing the RMS and maximum (peak to valley) group delay ripple (measured over 0.1 nm of bandwidth) for 8 cm long FBGs made from masks having different number of segments. Note that these graphs are by way of example only, as other FBGs would have different values. FIG. 3A depicts the graph 300 for 160 segments. Note that for 20 nanometers (nm) stitching errors, meaning that the individual errors are normally distributed about zero with an RMS value of 20 nm. The RMS curve 301 results in group delay ripple error of about 50 picosecond (ps). FIG. 3B depicts the graph 302 for 320 segments. Note that for 20 nm stitching error, the RMS curve 303 results in group delay RMS ripple error of about 35 ps. FIG. 3C depicts the graph 304 for 640 segments. Note that for 20 nm stitching error, the RMS curve 305 results in group delay ripple error of about 25 ps. FIG. 3D depicts the graph 306 for 1280 segments. Note that for 20 nm stitching error, the RMS curve 307 results in group delay ripple error of about 18 ps. FIG. 3E depicts the graph 308 for 2560 segments. Note that for 20 nm stitching error, the RMS curve 309 results in group delay ripple error of about 12 ps. This is approximately the variation of GDR given by the $1/\sqrt{N}$ scaling of effective stitching error.

Figure 4A:
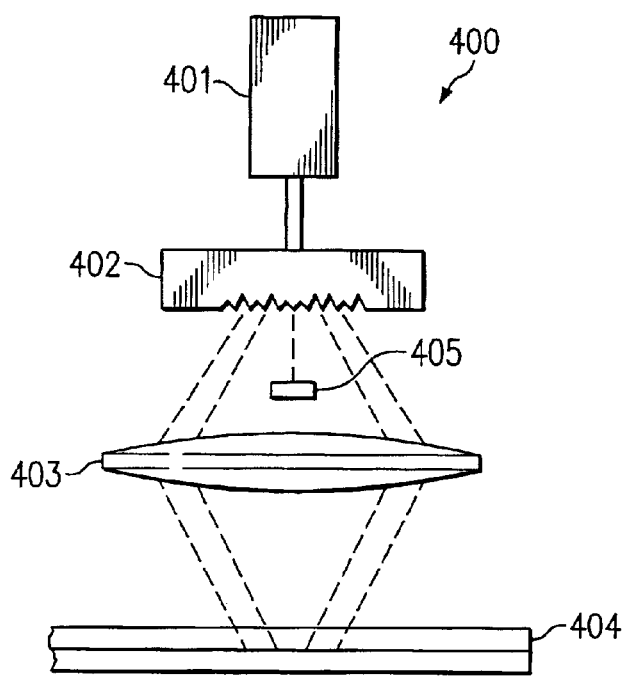
FIGS. 4A and 4B depict examples of systems configured to use the inventive mask of the first embodiment of the invention to record FBGs into fiber cores.

FIG. 4A depicts an example of a system 400 configured to use the inventive mask 402 to record a FBG onto the core of a fiber 404. A light source 401, e.g. ultraviolet laser, would provide the input beam. A phase mask 402, constructed in accordance with a preferred embodiment of the invention, as described herein, separates the light beam into two first order diffracted beams, which form the grating with the fiber core. A stop 405 may be used to block a zero order beam emanating from the mask 401. Additional steps (not shown) may be used to the $\pm 2^{nd}$ order, and higher orders, if present, emanating from mask 402. Note that if there is no zero order or other unwanted higher orders, then a stop (or stops) does not need to be used. A lens or lens system (a multiplicity of lenses) is used to image the mask and the $\pm 1^{st}$ diffracted orders on to the core of the fiber. The FBG may be written either using a large illuminating beam, which illuminates the entire FBG at once, or a smaller beam may be used to scan the fiber and thereby incrementally write the FBG. To use the scanning method either the beam and imaging system (lens(es), stops, and associated positioning hardware) are scanned in unison while the fiber and mask are stationary, or the mask and fiber are scanned in unison, while the imaging system and illuminating beam are stationary.

Figure 4B:
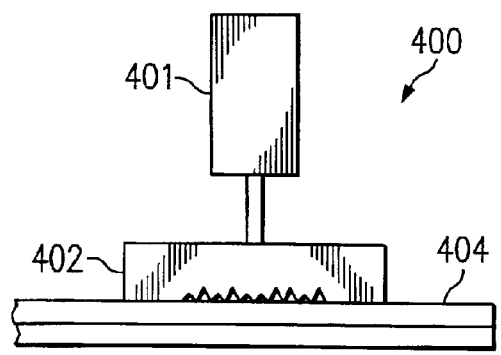

FIG. 4B depicts an alternative embodiment of the arrangement of FIG. 4A, wherein the imaging system is not used and the fiber 404 is placed in close proximity to the mask 402. This embodiment has an advantage of better mechanical stability, owing to the close coupling of the fiber and mask. However, it has the disadvantage of the additional diffracted orders which may be present, and the imperfect imaging (i.e. the diffraction over the short distance between the mask and the core of the fiber).

Figure 5:
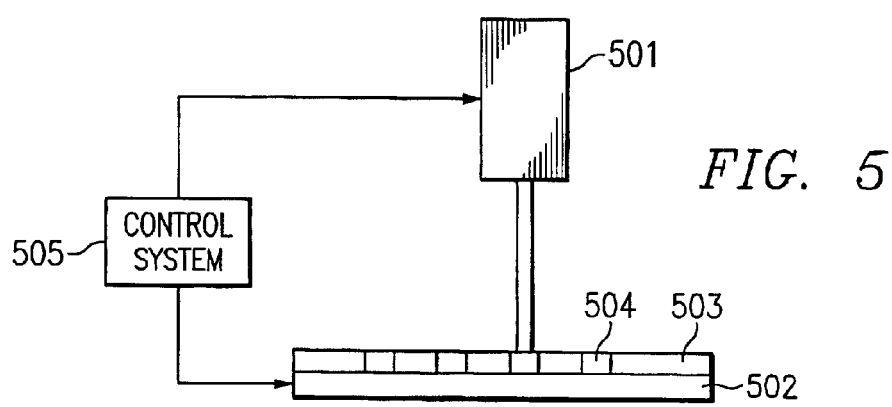
FIG. 5 depicts an example of a system configured to produce the inventive mask of the first embodiment of the invention.

FIG. 5 depicts an example of a system 500 configured to form the inventive mask of the different embodiments of the invention. The lithographic system 500 includes a light source or particle source 501, that provides a beam of light or stream of particles, respectively. The beam or stream is used to alter a characteristic of resist 503 in portions 504. The altered portions 504 will be used to form either spaces or bars for the mask, depending on the type of resist being used. In any event, after processing bars and spaces will be formed onto the substrate 502 to form the mask. Control system 505 controls the movement of either the substrate 502 or the source 501, or both, and the beam intensity during the bar/space writing process. Instead of exposing the resist 503, a fiber core can be directly exposed at the same location.

Note that the semiconductor industry has been the primary driver of mask writing equipment technology for more than 10 years. In the pursuit of smaller integrated circuit (IC) geometry's, multiple pieces of equipment are available which are capable of achieving the resolution required to make masks suitable for FBG. As already discussed, FBG requires resolution on the mask of about 0.5 micron. The capability to write 0.5 micron features on a mask was first available with e-beam mask writing equipment (such as that produced by Applied Materials, Etec Inc; Hitachi Corp.; Toshiba Corp., Leica Inc., and JEOL Inc.). However, this resolution is now available with optical laser mask writing equipment (such as that produced by Applied Materials, Etec Inc., and Micronic Laser, Inc.). In recent years, the IC industry has driven the requirement for placement precision of features on the mask from more than 10 nanometers to about 1 nanometer. However, even with this tremendous progress, the placement precision still falls about 1000 times short of the requirement necessary for non-linearly chirped FBG.

Common to all lithographic mask writing machines is the necessity to have the desired pattern reduced to a set of representative digital data, which when presented to the machine in the appropriate format instructs the machine where to expose and where not to expose. The writing tools accept design data with some minimum resolution which varies from machine to machine, but which is currently measured on a scale of nanometers. The highest resolution accepted by any suitable and available writing tool is 1 nanometer.

All of the machines have the capability to have scaling factors which can be tuned. Typically, a scaling factor is not programmable, as its purpose in making IC masks, is to ensure that a nanometer written is really equal to a traceable standard nanometer. A scaling check is typically performed on some periodic basis to ensure that calibration of the machine has not drifted. However, the inventive embodiments take advantage of the characteristic that making small adjustments to the scaling factor of a writing tool in the middle of a writing process can result in very small (e.g. picometer scale) changes in placement precision. In normal operation, when a writing tool scaling factor is changed, the machine stops and measures itself to ensure the accuracy of the scaling. After stopping and moving to another location for scaling measurements, the machines typically cannot find their original positions to an accuracy better than about one nanometer, which results in the aforementioned stitching error. If, however, a writing tool is configured to make scaling changes "on the fly", for example by ignoring the re-calibration procedure when the scaling adjustment is made, then stitching errors can be reduced. Furthermore, if the writing tool is configured to have a programmable scaling factor, then arbitrarily complex FBG masks can be fabricated with reduced errors. Specifically, where the lithography tool operates in a continuous writing manner and where the scaling factor changes in a continuous or stepwise continuous fashion. Note that the smaller the size of the stitching errors, the better the resulting FBG will be. The invention involves averaging out, to the extent possible, any unavoidable stitching errors, whatever their size may be. Thus, the invention involves the number of errors, and not their size. Moreover, reducing the size of the errors, while maintaining the number of errors would improve the final result of the averaging effect by having more errors with smaller values. For example, assuming a RMS size of the errors of 20 nm and having a total number of 100 errors would result in a net averaged error of $20/\sqrt{100}=2$ nm. By shrinking the RMS error to 10 nm, and still averaging over 100 errors would result in a net averaged error of $10/\sqrt{100}=1$ nm.

Most of the advanced writing tools have the capability to do some sort of averaging or gray-scaling within the tool itself to reduced size errors and placement resolution. In the discussion below, when a minimum writing grid or pixel is discussed, it is referring to the effective writing grid after averaging and gray-scaling has taken place. An example of an averaging or gray-scaling would be a writing beam that comprises multiple beams which are set on separate grids and which are off-set by some fraction of their beam widths. By controlling the dose of each beam independently, fractional beam width precision can be achieved in the resulting pattern.

Although there are many different commercial lithographic mask writing machines currently in use, each of which has different configurations and features, for the purpose of this discussion, they can be separated into three categories, namely raster e-beam, raster laser, and vector (or shaped) e-beam.

The first category uses a raster scanned e-beam or electron beam. The writing time for this type of tool scales with the inverse square of the writing grid. For practical mask writing, a grid of 25 nanometers or more is required. Using this type of writing tool, the data is described as a digital field of 25 nm (minimum) pixels. For the inventive method described below, where each bar is rounded (snapped) to the nearest pixel location, placement errors occur in every period (~1 $\mu$m). The RMS of the individual errors is ±(0.29) 25~7.5 nm, ~1000 errors are averaged in a 1 mm effective length, and thus the error averaging formula predicts a reduction in the effective error of $\sqrt{1000}$~30, or a net averaged error of about 7.5 nm/30=250 pm. These tools generally operate by scanning one or multiple beams in a raster pattern across the mask, where the beam is effectively turned on and off, on the fly, according to the pattern in the design data file. For further information see www.etec.com/products/pdf/pb_m5500.pdf the disclosure of which is hereby incorporated herein by reference.

The second category uses a laser raster scan. These machines have writing grids as small as 5 nm, or possibly even smaller. These machines use multiple beams in parallel, for example 24 or 32 beams, which implement elaborate multiple exposure and averaging schemes to reduce placement error. Because of the multiplicity of beams, it is more difficult to implement an arbitrary on the fly scaling approach for adjusting placement resolution. However, with the smaller effective grid, the minimum net average error is greatly reduced. For further information see www.etec.com/products/pdf/pb_a3700.pdf the disclosure of which is hereby incorporated herein by reference.

The third category uses a shaped e-beam. In this type of writing system, instead of having a grid which is rasterized with an on/offbeam, each geometrical shaped is written separately. The design data is broken down into a set of shapes (e.g. rectangles or trapezoids). The writing time for this type of machine is a function of the number of shapes that are required to write the complete pattern. The effective writing grid for this type of tool is as low as 1 nanometer. As a result, using the inventive grid snapping embodiment described below is very effective to reduce the GDR. These tools will typically write a series of shapes in one field, called a sub-field, while the writing stage is stationary, then move onto another sub-field for the next set of shapes. Since these machines have the same nanometer scale reposition accuracy as other writing tools, the sequence of moving and stopping at each sub-field has the potential to induce stitching errors. By reducing the size of the sub-field in accordance with the first embodiment of the invention, the net average error can be reduced. For more information, see U.S. Pat. No. 6,114,071 issued to Chen et al. Sep. 5, 2000, the disclosure of which is hereby incorporated herein by reference.

The second embodiment continuously writes the desired pattern into a fiber or mask. For example, the system shown in FIG. 5 could be used to write such a continuous pattern. In writing a grating pattern that includes a fine scale chirp, the desired period of the bars and spaces may not be achievable using the address unit or pixel grid of the writing equipment. The prior art used segments with re-scaling to accomplish the fine chirp. For example, in a typical grating, the width and spacing of the bars are on the order of 500 nm. A fine scale chirp may have a change in period of only 0.01 picometers per bar (note that 1000 picometers equals 1 nanometer). The address unit or pixel size of the system shown in FIG. 5 is typically 25 nanometers or larger, although some systems today have 1–5 nanometer pixel size. Consequently, the pixel size cannot achieve the fine subpicometer scale needed for a typical design variation of mask period, e.g. chirp.

As discussed above, with respect to the stitching errors, the light that passes through an FBG with many fine scale period errors is not fully subjected to these small scale irregularities, but rather is effected by the average of the errors over some effective averaging length. Thus, this embodiment of the invention moves (or snaps) every edge of the bars and spaces of the desired pattern to the nearest address unit or pixel grid. Previous to this invention the prior art belief was that such a large number of errors would increase the GDR of FBGs fabricated with such a mask. However, based on the discovery of the described averaging effect of the edge errors, this embodiment can be used to reduce stitching error and GDR.

Figure 6:
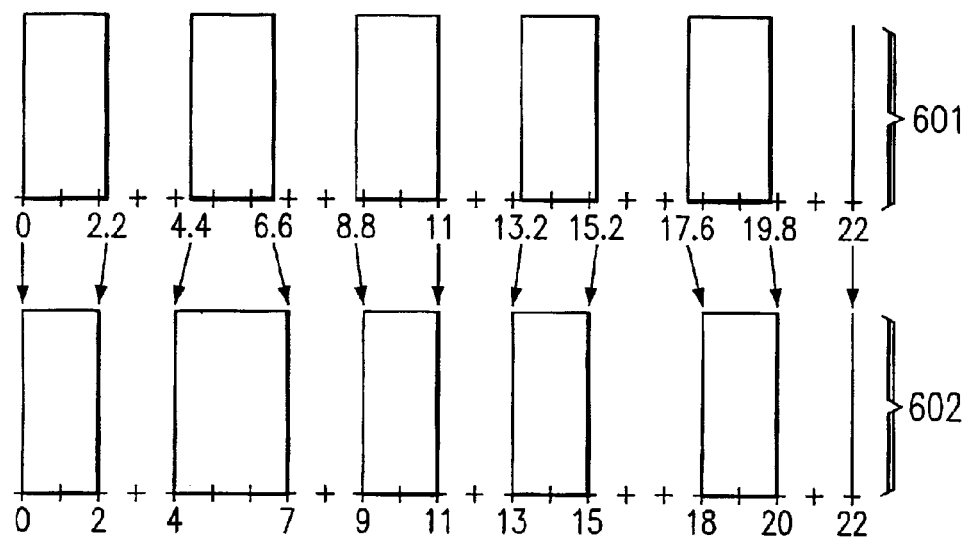
FIG. 6 depicts an example of snapping a desired pattern to a pattern usable by manufacturing equipment according to a second embodiment of the invention.

For example, as shown in FIG. 6 a desired pattern 601 has bars and spaces that are 2.2 pixels in width, where the exact address unit or pixel size is dependent on the fabrication equipment. Thus, some of the edges of the desired pattern will have to be shifted or snapped, in processing the desired pattern, to a grid of locations which are separated by a single pixel. One example of the shifted or snapped pattern is pattern 602. Snapped pattern 602 is the result of moving the edges to the nearest pixel grid location. Note that this pattern is by way of example only, as other snapped patterns could be formed. For example, always snapping to a particular side, e.g. left or right. Thus, for always snapping right, the line at 2.2 would be snapped to location 3. Another example is to always snap to increase the size of the bars (and thereby always decrease the size of the spaces). Alternatively, another example is to always snap to decrease the size of the bars (and thereby always increase the size of the spaces).

Snapping to the nearest pixel location shall be referred to as 'rounding' and is preferable as it introduces the least amount of error into the formed pattern. Rounding also tends to keep the line widths and duty cycle of the bars and spaces as close as possible to the desired design. For example, as shown in FIG. 6, the duty cycle for the desired pattern 601 is 50%, meaning half of the pattern is bars and half of the pattern is spaces, i.e. 11 blocks of bars and 11 blocks of spaces. The duty cycle of the snapped pattern 602 is also 50%, with 11 blocks of bars and 11 blocks of spaces.

Figure 7:
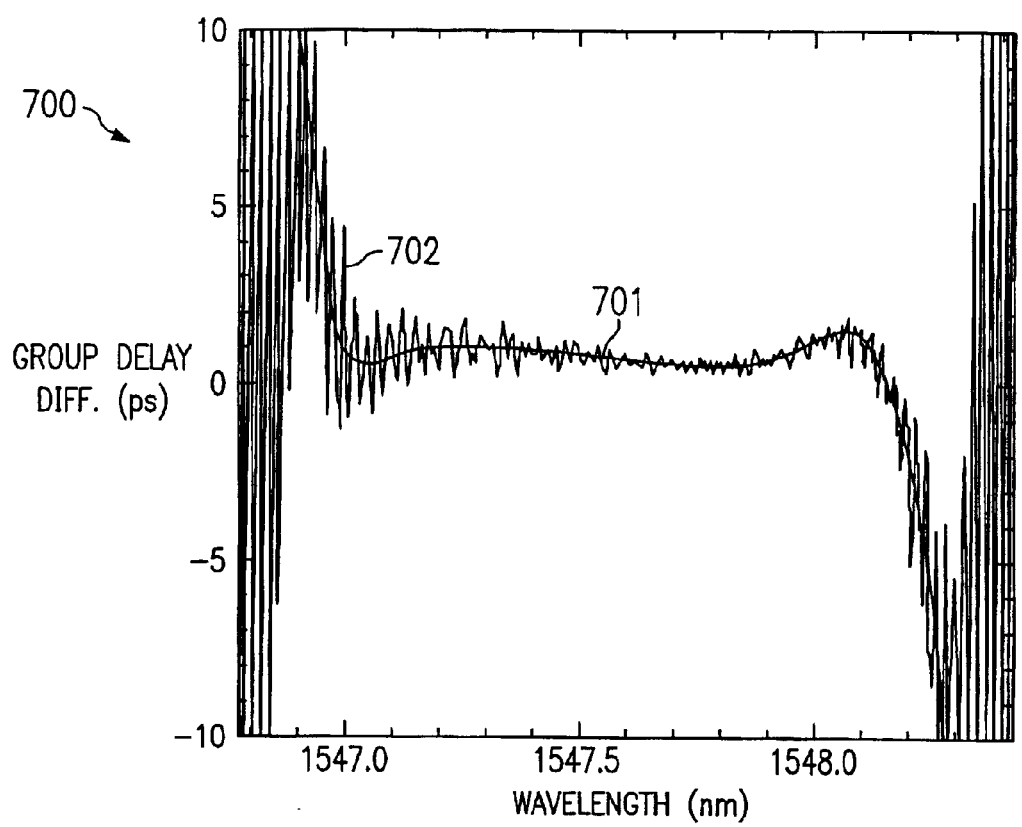
FIG. 7 depicts an example of a calculation of the group delay ripple error in a FBG manufacturing according to the second embodiment of the invention.

An example of the calculated GDR of an FBG fabricated from a 10 cm linearly chirped mask made by snapping all the edges of the mask to the next nearest grid line (spaced at a pixel size of 5 nm) is shown in FIG. 7. As shown, the flat central region 701 of this plot 700 has a very small (~1 psec) GDR. Note that this GDR is smaller than the GDR of the embodiment shown in FIG. 3. In the embodiment of FIG. 3, the number of stitching errors was increased to as many as 2500 over the length of the mask. In the snapping embodiment, the equivalent number of errors is determined by the actual total number of bars, which is about 100,000. As a result, the number of stitching errors is increased by about 40 times and the statistical argument for averaging of errors would indicate an improvement of about $1/\sqrt{40} \cong 1/6$ over the GDR found in FIG. 3E. The RMS GDR for a 5 nm stitching error in FIG. 3E is about 3 ps, and thus based on square root scaling, an estimate of the GDR for the snapping embodiment is about 0.5 ps, which is consistent with the results shown over the central region 701 of the plot 700 of FIG. 7. The calculated result for an ideal grating, i.e. perfect scaling without snapping, is shown by line 702.

Other schemes could also be used to make snapping decisions for any particular edge or group of edges. For example, a decision mechanism could determine that a particular region of a snapped pattern will have an error in the duty cycle (owing to statistical variations), such that there is an excess in overly wide bars. The mechanism could then skew the snapping decisions so as to balance duty cycle for the pattern over the region. Note that the mechanism may move one or more edges to balance out the duty cycle or to equalize the bar widths.

Figure 8:
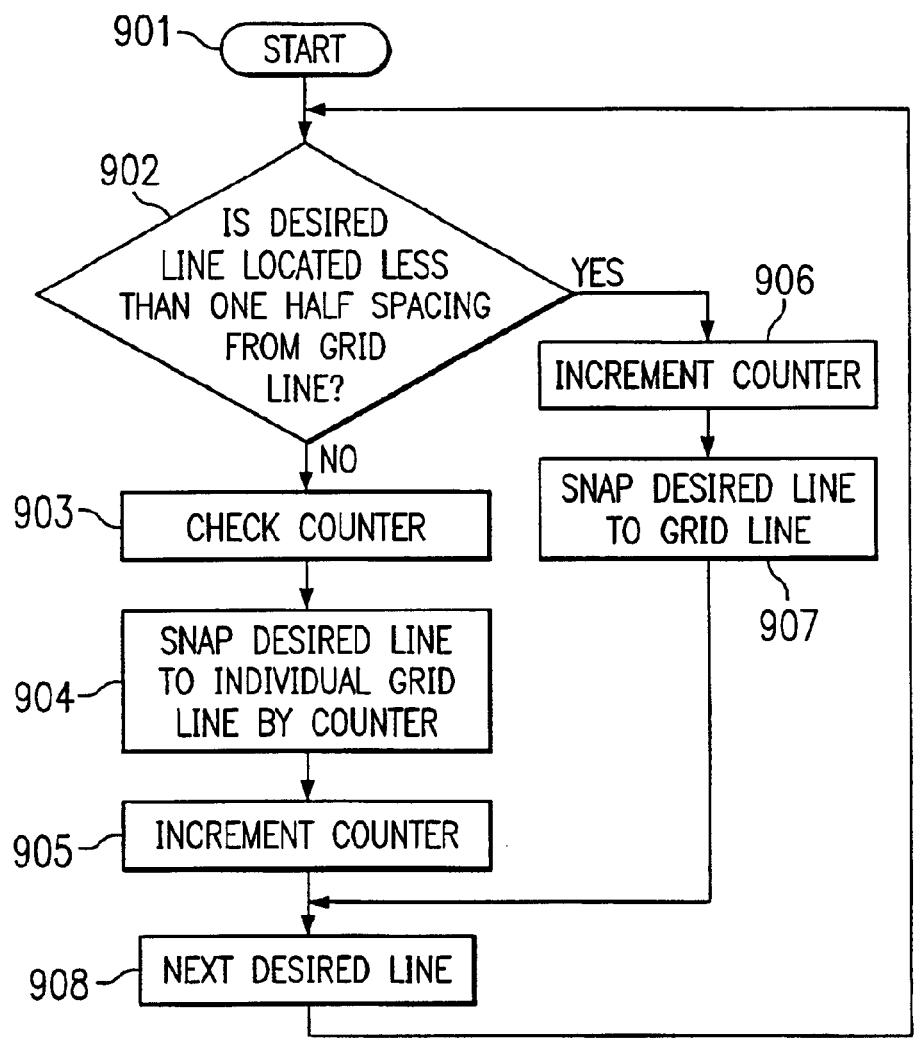
FIG. 8 depicts a flowchart of the inventive snapping mechanism according to the second embodiment of the invention.

FIG. 8 depicts an example of a rounding mechanism according to the above described embodiments. The mechanism would start for a particular desired edge 901. The mechanism determines whether the desired edge is located less than one half pixel spacing from a grid line 902. If so, then the mechanism snaps the desired line to the grid line that is less than one half pixel spacing. Optionally, a counter or monitor may be incremented 906 to account for duty cycle or line width differences. The mechanism checks the counter 903 to determine whether to round up or down. The mechanism the snaps the desired edge to the grid line as indicated by the counter 904. The counter is then incremented 905 to indicate either the amount of duty cycle or line width difference. The mechanism then proceeds to the next desired edge 908. An optional block (not shown) could be inserted before block 906 to determine whether the snapping will be up or down, based upon the duty cycle. Thus, block 907 would be modified to cause snapping to the grid line indicated by the optional (not shown) block. This would allow for the regional errors in the duty cycle or line widths to be compensated.

Note that for the sake of simplicity, the pixel size has been described in the above examples in terms of 1 unit. However, this unit may be of any size, e.g. 25 nanometers, etc. Also note that the patterns, duty cycles, bar widths, spacing widths, chirps described above are by way of example only as other patterns and values, including both linear and/or non-linear chirps, could be used. Also note that the patterns have been numbered in units from left to right by way of example only, as other numbering convention, e.g. right to left, etc. could be used.

Note that the feathering technique described in U.S. patent application Ser. No. 09/883,081 entitled "LITHOGRAPHIC FABRICATION OF PHASE MASK FOR FIBER BRAGG GRATINGS" filed Jun. 15, 2001, the disclosure of which is hereby incorporated herein by reference in its entirety, can be used to adjust the boundaries of the snapped grid.

Note that invention is operative for masks and/or gratings having phase shifts. A phase shift is a space between bars in the grating that is larger or smaller than usual. Thus, a phase shift is similar to a stitching error, but larger in scale. These shifts are valuable for making multi-channel FBGs for use in WDM communication systems. A number of techniques are available induce phase shifts. For example, in holographic systems, the phase shifts can be generated by movement of the mask/fiber or illumination system with respect to each other, or by changing the relative phase between the two beams of the interferometer. In lithographic systems, the phase shift is merely included in the written pattern. The phase shift can be chosen in a manner to generate a particular envelope of WDM channels. Such a technique is described in U.S. application Ser. No. 09/757,386, which is hereby incorporated herein by reference. For the embodiments described herein, a phase shift can be introduced by adjusting the position of the bars/spaces as needed, or by adjusting the spacing between the different segments with respect to each other.

Further note that the first and second embodiments of the invention are useable together. For example, the stitching errors of the segments and/or sub-segments may be induced by snapping or rounding the edges of the bars and spaces to the nearest pixel locations.

When implemented in software, the elements of the present invention may be code segments that are able to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The code aspects of the present invention may be operated on a general purpose computer and/or personal computer.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for producing an optical grating comprising:

designing an optical pattern;

inducing a first predetermined number of positioning errors into the pattern to reduce the average of the errors to a second predetermined number; and recording the pattern with the first predetermined number of errors into an optical element.

2. The method of claim 1 wherein the pattern comprises a plurality of segments, and the step of inducing errors comprises:

writing an additional number of segments than are required by a desired design.

3. The method of claim 1 wherein:

the second predetermined number is about zero.

4. The method of claim 1 wherein:

the optical element is a mask, and the mask is used to form the grating.

5. The method of claim 4 wherein the step of recording comprises the step of:

exposing the mask with at least one beam.

6. The method of claim 4 wherein:

the errors are stitching errors; and a group delay ripple error of the grating is decreased as the number of stitching errors is increased.

7. The method of claim 1 wherein:

the pattern includes information associated with one of a linear chirp and a non-linear chirp.

8. The method of claim 1 wherein the pattern comprises a plurality of segments, and the step of inducing comprises:

inducing a plurality of stitching errors into the pattern.

9. The method of claim 8 wherein the step of inducing the sufficient number of errors further comprises:

forming at least one segment to have a different period by adjusting a scaling factor of manufacturing equipment that is used in the step of recording.

10. The method of claim 8 wherein:

each segment has an arbitrary period with respect to at least one of a previous segment and a subsequent segment in the pattern.

11. The method of claim 8 wherein the pattern comprises a plurality of bars and spaces, and the step of inducing the plurality of stitching errors comprises:

adjusting desired locations of edges of bars and spaces to pixel locations that are useable by manufacturing equipment used in the step of recording.

12. The method of claim 11 wherein:

the pixel locations coincide with a periodic grid.

13. The method of claim 12 wherein:

a size of the period of the grid is 25 nm or less.

14. The method of claim 12 wherein:

a size of the period of the grid is 10 nm or less.

15. The method of claim 11 wherein the step of adjusting comprises:

adjusting each of the desired locations to the nearest pixel location.

16. The method of claim 11 wherein:

the step of adjusting moves each desired location by up to one half of pixel spacing.

17. The method of claim 8 wherein the step of inducing a plurality of stitching errors comprises:

forming a plurality of sub-segments for each segment of the plurality of segments.

18. The method of claim 17 wherein:

at least one segment has a different period; and each sub-segment has the same period as the segment from which it was formed.

19. The method of claim 17 wherein:

at least one segment has a different period; and each sub-segment has a scaled period, such that sequential sub-segments from a particular segment have periods that range from a period that is greater than the period of a previous segment to a period that is less than the period of a subsequent segment.

20. The method of claim 17 wherein:

each sub-segment has an arbitrary period with respect to at least one of a previous sub-segment and a subsequent sub-segment.

21. The method of claim 1 wherein the pattern is continuously recorded into the optical element and comprises a plurality of bars and spaces, and the step of inducing comprises:

adjusting desired locations of edges of bars and spaces to pixel locations that are useable by manufacturing equipment used in the step of recording.

22. The method of claim 21 wherein:

the pixel locations coincide with a periodic grid.

23. The method of claim 22 wherein:

a size of the period of the grid is 25 nm or less.

24. The method of claim 22 wherein:

a size of the period of the grid is 10 nm or less.

25. The method of claim 21 wherein the step of adjusting comprises:

adjusting each of the desired locations to the nearest pixel location.

26. The method of claim 21 wherein:

the step of adjusting moves each desired location by up to one half of pixel spacing.

27. The method of claim 1 wherein the step of recording comprises the step of:

writing the pattern with at least one raster scanned e-beam.

28. The method of claim 1 wherein the step of recording comprises the step of:

writing the pattern with at least one raster scanned laser beam.

29. The method of claim 28 wherein:

the step of writing uses at least 24 beams.

30. The method of claim 28 wherein the step of writing uses a plurality of beams in parallel, and the method further comprises:

repeating the step of writing for multiple exposures and thereby reduce placement error.

31. The method of claim 1 wherein the step of recording comprises the step of:

writing the pattern with at least one shaped e-beam.

32. The method of claim 31 wherein the step of writing the pattern with at least one shaped e-beam comprises the step of:

writing a plurality of at least one type of geometrical shape.

33. The method of claim 32 wherein the step of writing the pattern further comprises the step of:
  performing the step of writing the plurality of at least one type of geometrical shape for a sub-field of the optical element;
  repositioning writing equipment after the step of performing for a subsequent sub-field.

34. The method of claim 1 wherein the step of recording operates with manufacturing equipment with a writing grid size of less than or equal to 10 nanometers.

35. The method of claim 1 wherein the step of recording operates with manufacturing equipment with a writing grid size of less than or equal to 25 nanometers.

36. The method of claim 1 wherein:
  optical element is a fiber, and the step of recording forms the grating in the fiber.

37. The method of claim 36 wherein:
  a group delay ripple error of the grating is decreased as the number of errors is increased.

38. The method of claim 1 further comprising:
  including at least one phase shift in the pattern;
  wherein the step of recording is operative to record the pattern with the at least one phase shift into the optical element.

39. A system that produces an optical grating, the system comprising:
  means for designing an optical pattern;
  means for inducing a first predetermined number of positioning errors into the pattern to reduce the average of the errors to a second predetermined number; and
  means for recording the pattern with the first predetermined number of errors into an optical element.

40. The system of claim 39 wherein the pattern comprises a plurality of segments, and the means for inducing errors comprises:
  means for writing additional segments than are required by a desired design.

41. The system of claim 39 wherein:
  the second predetermined number is about zero.

42. The system of claim 39 wherein:
  the optical element is a mask, and the mask is used to form the grating.

43. The system of claim 42 wherein the means for recording comprises:
  means for exposing the mask with at least one beam.

44. The system of claim 42 wherein:
  the error s are stitching errors, and
  a group delay ripple error of the grating is decreased as the number of stitching errors is increased.

45. The system of claim 39 wherein:
  the pattern includes information associated with one of a linear chirp and a non-linear chirp.

46. The system of claim 39 wherein the pattern comprises a plurality of segments, and the means for inducing comprises:
  means for inducing a plurality of stitching errors into the pattern.

47. The system of claim 46 wherein the means for inducing the sufficient number of errors further comprises:
  means for forming at least one segment to grating having different period from another segment of the grating by adjusting a scaling factor of the means for recording.

48. The system of claim 46 wherein:
  each segment has an arbitrary period with respect to at least one of a previous segment and a subsequent segment in the pattern.

49. The system of claim 46 wherein the pattern comprises a plurality of bars and spaces, and the means for inducing the plurality of stitching errors comprises:
  means for adjusting desired locations of edges of bars and a spaces to pixel locations that are useable by the means for recording.

50. The system of claim 49 wherein:
  the pixel locations coincide with a periodic grid.

51. The system of claim 50 wherein:
  a size of the period of the grid is 25 nm or less.

52. The system of claim 50 wherein:
  a size of the period of the grid is 10 nm or less.

53. The system of claim 49 wherein the means for adjusting comprises:
  means for adjusting each of the desired locations to the nearest pixel location.

54. The system of claim 49 wherein:
  the means for adjusting moves each desired location by up to one half of pixel spacing.

55. The system of claim 46 wherein the means for inducing a plurality of stitching errors comprises:
  means for forming a plurality of sub-segments for each segment of the plurality of segments.

56. The system of claim 55 wherein:
  at least one segment of the grating has a different period from another segment of the grating; and
  each sub-segment has the same period as the segment from which it was formed.

57. The system of claim 55 wherein:
  at least one segment of the grating has a different period from another segment of the grating; and
  each sub-segment has a scaled period, such that sequential sub-segments from a particular segment have periods that range from a period that is greater than the period of a previous segment to a period that is less than the period of a subsequent segment.

58. The system of claim 55 wherein:
  each sub-segment has an arbitrary period with respect to at least one of a previous sub-segment and a subsequent sub-segment.

59. The system of claim 39 wherein the pattern is continuously recorded into the optical element and comprises a plurality of bars and spaces, and the means of inducing comprises:
  means for adjusting desired locations of edges of bars and spaces to pixel locations that are useable by the means for recording.

60. The system of claim 59 wherein:
  the pixel locations coincide with a periodic grid.

61. The system of claim 60 wherein:
  a size of the period of the grid is 25 nm or less.

62. The system of claim 60 wherein:
  a size of the period of the grid is 10 nm or less.

63. The system of claim 59 wherein the means for adjusting comprises:
  means for adjusting each of the desired locations to the nearest pixel location.

64. The system of claim 59 wherein:
  the means for adjusting moves each desired location by up to one half of pixel spacing.

65. The system of claim 39 wherein the means for recording comprises:
  means for generating at least one raster scanned e-beam.

66. The system of claim 39 wherein the means for recording comprises:

means for generating at least one raster scanned laser beam.

67. The system of claim 66 wherein:

the means for generating at least one raster scanned laser beam generates at least 24 beams.

68. The system of claim 66 wherein:

the means for generating at least one raster scanned laser beam generates a plurality of beams in parallel and are used for multiple exposures and thereby reduce placement error.

69. The system of claim 39 wherein the means for recording comprises:

means for generating at least one shaped e-beam.

70. The system of claim 69 wherein the at least one shaped e-beam writes a plurality of at least one type of geometrical shape.

71. The system of claim 70 wherein the means for generating at least one shaped e-beam writes the plurality of at least one type of geometrical shape for a sub-field of the optical element, and repositions after writing for a subsequent sub-field.

72. The system of claim 39 wherein the means for recording has a writing grid size of less than or equal to 10 nanometers.

73. The system of claim 39 wherein the means for recording has a writing grid size of less than or equal to 25 nanometers.

74. The system of claim 39 wherein:

the optical element is a fiber, and means for recording forms the grating in the fiber.

75. The system of claim 74 wherein:

a group delay ripple error of the grating is decreased as the number of errors is increased.

76. The system of claim 39 wherein:

the pattern includes at least one phase shift; and the means for recording is operative to record the pattern with the at least one phase shift into the optical element.

* * * * *